United States Patent
Li (10) Patent No.: US 6,330,753 B1
(45) Date of Patent: Dec. 18, 2001

(54) GAUGE FOR MEASURING LARGE DIAMETER

(75) Inventor: Bin Li, Nanjing (CN)

(73) Assignee: Southeast University, Nanjing (CN)

( * ) Notice: Subject to any disclaimer, the term of this patent is extended or adjusted under 35 U.S.C. 154(b) by 0 days.

(21) Appl. No.: 09/269,192

(22) PCT Filed: Aug. 20, 1997

(86) PCT No.: PCT/CN97/00083

§ 371 Date: Mar. 30, 1999

§ 102(e) Date: Mar. 30, 1999

(87) PCT Pub. No.: WO98/14750

PCT Pub. Date: Apr. 9, 1998

(30) Foreign Application Priority Data

Oct. 3, 1996 (CN) .................................... 96117113

(51) Int. Cl.⁷ ............................... G01B 5/00; G01B 5/20
(52) U.S. Cl. ......................... 33/555.1; 33/550; 33/552; 33/557
(58) Field of Search ....................... 333/555.1, 555.4, 333/557, 552, 550, DIG. 1, 536, 537, 567

(56) References Cited

U.S. PATENT DOCUMENTS

| | | | |
|---|---|---|---|
| 2,489,733 | * 11/1949 | Ullman | 33/536 |
| 2,637,907 | * 5/1953 | Aubrey | 33/555.4 |
| 2,831,256 | * 4/1958 | Werle | 33/567 |
| 3,311,986 | * 4/1967 | Zawistowski | 33/557 |
| 4,324,049 | * 4/1982 | Blose | 33/199 B |
| 4,586,266 | * 5/1986 | Leumann | 33/531 |
| 4,729,174 | * 3/1988 | Caron et al. | 33/504 |
| 4,765,065 | * 8/1988 | Bennett | 33/556 |
| 4,976,045 | * 12/1990 | Schley | 33/537 |
| 5,732,475 | * 3/1998 | Sacks et al. | 33/555.4 |
| 5,778,553 | * 7/1998 | Hollensbe | 33/810 |

FOREIGN PATENT DOCUMENTS

| | | | |
|---|---|---|---|
| 1270668 | * 4/1972 | (GB) | 33/536 |
| 2197477 | * 5/1988 | (GB) | 33/555.1 |
| 03296613 | * 12/1991 | (JP) | 33/555.1 |
| 0226180 | * 9/1968 | (SU) | 33/555.4 |

* cited by examiner

Primary Examiner—Diego Gutierrez
Assistant Examiner—Lydia M. De Jesús
(74) Attorney, Agent, or Firm—Arent Fox Kintner Plotkin & Kahn, PLLC (57) ABSTRACT

A large diameter gauge consists of a series of measuring units. Each measuring unit comprises two positioning elements(11,12), a fastener(14) and a body(13). These series of measuring units are placed and fixed sequentially and head to end or end to head around the circumference of the cylinder or hole to be measured during measuring until the remained space is not large enough to be put into another one measuring unit. Measuring the distance between the first measuring unit and the last measuring unit, the diameter to be measured can be obtained through the geometric relations between the gauges and the cylinder or hole to be measured.

13 Claims, 7 Drawing Sheets

GAUGE FOR MEASURING LARGE DIAMETER

TECHNICAL DOMAIN

This invention relates to a measuring apparatus and method that bears the characteristics of employing mechanical method to measure large-diameter-workpiece; especially using with compact measuring apparatus, in the field of measuring technology.

BACKGROUND OF THE TECHNOLOGY

The characteristic of measuring large diameters is that the measuring apparatus is usually with large dimension and heavy weight, which leads to many problems such as much difficulty of operation in situ, complexity of calibration, large deformation and high cost. The roller way (Page 21–22, Volume 1, Foreign Metrology, 1991) provided a method to measure large diameters with compact measuring apparatus. It is necessary to include many parts in such method, such as the roller, badge, sensor of revolution, sensor of compaction, disk of glass grating, pulse counter, microprocessor, keyboard, digital-displaying device and so on. The diameter of the workpiece is obtained by counting the revolution of the known-diameter roller that is contacted with and rotated purely following the workpiece, when the workpiece rotates a whole or several whole numbers of revolution. The method suffers the following disadvantages. (1) Since the slippage of the roller on the surface of the workpiece is inevitable, it usually suffer the problem of bad repeatability and limited accuracy, which is the vital disadvantage of this method. (2) The measuring apparatus is complex and expensive. (3) Because the workpiece must revolve while measuring, it can only be employed on machine. (4) The workpiece to be measured must has a whole circumference.

CONTENTS OF THE INVENTION

The purpose of this invention is to provide a large diameter gauge that has the features of simple structure, small volume, high accuracy and good versatility. After marking down the parameters of the measuring units tightly placed around the workpiece and getting the closed size by measurement, an equation with the diameter to be measured as the variable can be obtained according to the geometric relations. Then, the diameter of the workpiece can be solved from this equation.

In order to achieve above purpose, a series of independent measuring gauges (measuring units) and some accessories were arranged according to this invention. Each measuring gauge consists of two positioning elements, a fastener and a body. The two positioning elements are a ball and a roller, which are placed at the two ends of the body. The fastener is placed on the body. Its action is to position the measuring gauge around the circumference of the workpiece through the two positioning elements and fix it. The fastener should ensure that the measuring gauge does not off-contacts with the workpiece owing to the gravity of the measuring gauge at any position.

The subject matter of the invention is described as follows: It consists of a series of independent measuring gauges and some accessories. Each measuring gauge consists of two positioning elements, a fastener and a body. The two positioning elements are a ball and a roller respectively, which are placed at the two ends of the body. The fastener is set on the body. The diameters of the ball and roller, which are above-mentioned two positioning elements, are known. They may not, but suggested, be equal. The distance between the axis of the roller and the center of the ball (hereinafter referred to as the Central Distance) is also known. The central distance of every gauge may not, but suggested, be equal. If the roller is looked upon as the head and the ball as the end, the measuring gauges are placed and, with fastener, around the circumference of the cylinder or hole to be measured in such a way that each adjacent gauges are contacted head to end or end to head. The gauges are arranged in such a way that the contacting elements between the adjacent gauges are one ball and one roller, so that the contacting area of every two adjacent gauges is always a point, reducing the contact error and improving the measurement precision. In addition, the operation is easier. Do in such way until the remnant space between the first and the last gauge is not large enough to be put into another one gauge. Now measure the closed size, i.e., the distance between the roller's axis of the first gauge and the ball's center of the last gauge, or that between the ball's center of the first gauge and the roller's axis of the last gauge. If the diameters of all the balls and rollers are equal and the central distance of all the gauges are equal, the following equation can be obtained according to the geometrical relations of the gauges and workpiece.

$$n2\alpha + (n-1)2\beta + 2\gamma = 2\pi$$

where $$\sin\alpha = \frac{l}{D \pm d} \quad \sin\beta = \frac{d}{D \pm d} \quad \sin\gamma = \frac{l'}{D \pm d}$$

where D is the diameter to be measured, d is the diameter of the ball or roller, l is the central distance, l' is the closed size and n is the number of the gauges that surround the workpiece. The sign "+" in the sign "±" of the above equation means the situation that the outside diameter is measured and "−" means the situation that the inside diameter is measured. Then, the following equation can be obtained.

$$n\sin^{-1}\frac{l}{D \pm d} + (n-1)\sin^{-1}\frac{d}{D \pm d} + \sin^{-1}\frac{l'}{D \pm d} = \pi$$

The diameter D can be solved from the above equation with computers or the programmable calculators. If the diameters of the rollers and balls and the central distances of the gauges are not equal each other, the diameter of the workpiece can be also obtained in the similar way according to the geometrical relations of the gauges and workpiece, in which the actual values of those parameters of the gauges are employed.

The above-mentioned way of measuring large diameters is named the circling way, in which the measuring gauges are placed and fixed sequentially and head to end or end to head around the circumference of the cylinder or hole to be measured with the fasteners. Put the gauges one by one until the space between the first and the last gauges is not large enough to be put into another one gauge. Now we can mark down the parameters of the gauges placed and measure the closed size. Then the diameter of the workpiece can be obtained through the geometric relations.

The invention is with the following characteristics:
1. Versatility: Both external and internal diameters of cylinder or hole can be measured, and there is no upper limitation of measuring range. Even if there is a gap or more in the cylinder or hole, the diameter can also be measured.

2. Simple structure, compact volume and easy to be operated. Even one person can accomplish the whole measurement.
3. Easy to be calibrated. Because the central distance of the gauges and the diameters of the roller and the ball are small, the measuring gauges are easy to be calibrated accurately with the available precision instruments.
4. Low cost.
5. High precision. Because the central distance of the gauges and the diameters of the roller and the ball can be calibrated accurately, and the measurement is performed on the whole circumference of the workpiece, the method has very high precision.

DETAILED DESCRIPTION OF THE PREFERRED EMBODIMENTS OF THE INVENTION

First Embodiment

Figure 1:
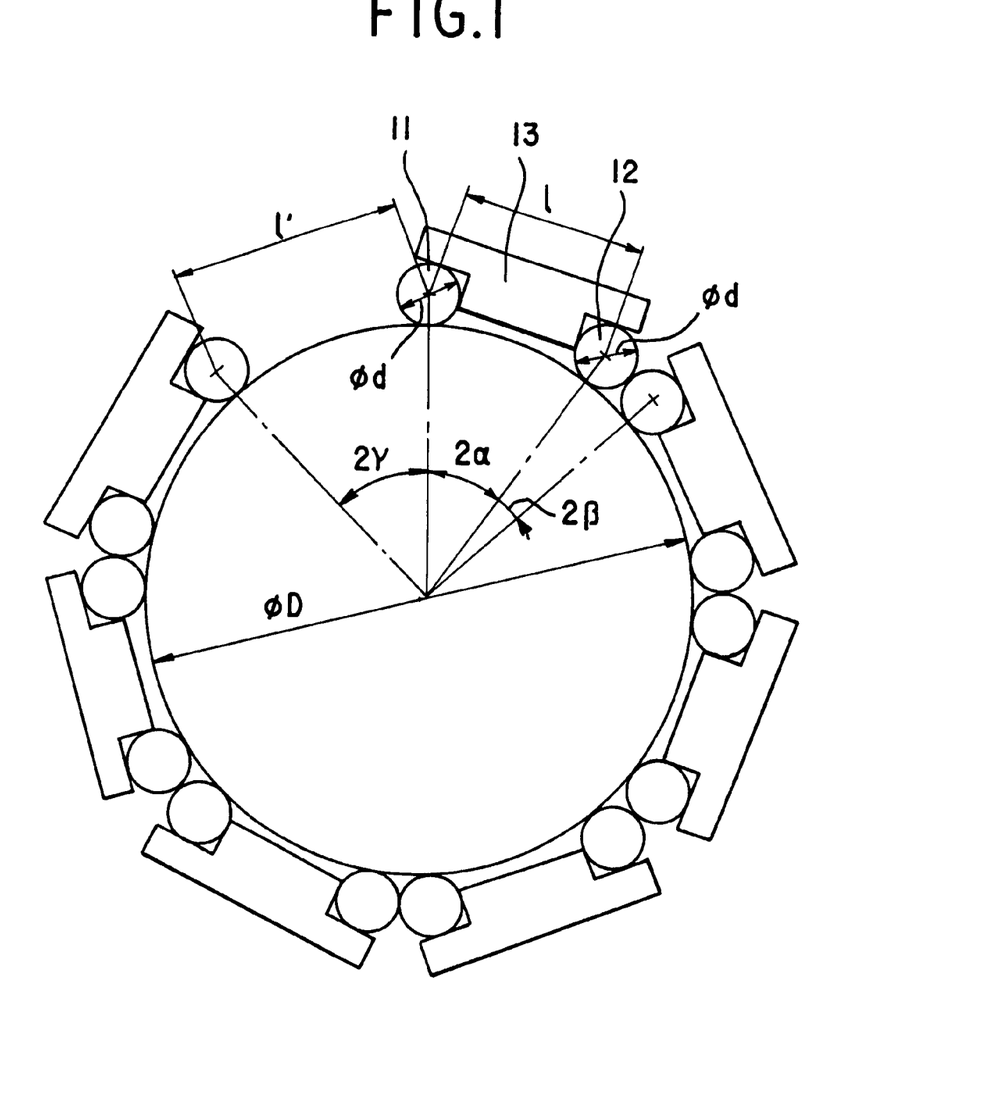
FIG. 1 is a schematic diagram of the method of measuring large diameters of the invention.
Figure 2:
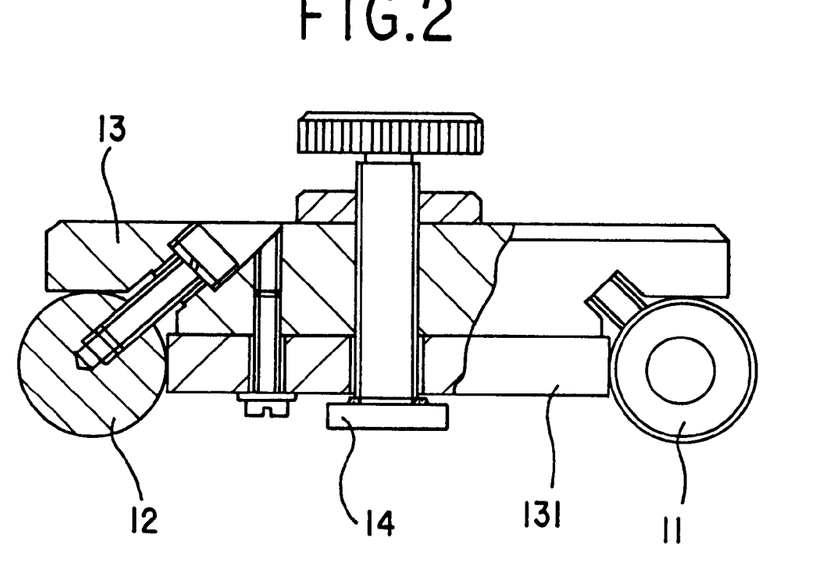
FIG. 2 is a schematic view of the structure of the measuring gauge of the first embodiment.

As shown in FIG. 1, positioning elements 11 is a roller, but 12 can be a ball or a roller. When the two positioning elements are rollers, their axes should be parallel each other. The two positioning elements are fixed at the two ends of the body 13. A measuring block 131 is also installed on the body 13, its two ends contact with the two positioning elements (FIG. 2). The accuracy and accordance of each gauge's central distance can be guaranteed by current manufacturing technology of standard blocks. There is an adjustable screw at the center of the body 13. A fastener 14 of permanent magnet is arranged at the end of the screw. The above-mentioned elements form a measuring gauge of this invention. The measuring gauges are attached and fixed firmly on the out- or in-circumference of the steel- or iron-made workpiece by fastener 14. The magnet force between the gauge and workpiece can be adjusted by turning the screw. In order to improve the contacting condition between the end surface of the measuring block 131 and the positioning elements 11 and 12, a small plane can be processed on the positioning elements 11 and 12 at the contacting area to change the point contacting and line contacting to plane contacting. Thus the assembling deformation of the gauge can be reduced.

The measurement of the large diameters can be also accomplished with only a few of the gauges alternatively in such a way that the other gauges are placed in turn while keeping the first or first several gauges unmoved. This way is called the alternating way. If there are only three gauges available, it works like this. Put the three gauges upon the circumference of the workpiece firstly. Then while keeping the first and the third gauges being unmoved, take the second gauge off slowly and place it again upon the workpiece but behind the third gauge. Afterwards, while holding the second gauge being unmoved; take the third gauge off slowly and put it again upon the workpiece but behind the second gauge. It is not stopped until the space between the first and last gauge (the second or the third gauge) is not large enough to be place into another one gauge. Sometimes, either in the circling way or the alternating way, some size-known plug gauge, measuring block or roller and so on can be inserted between the gauges to make measuring operation easier; but would not be of influence on to obtain the correct result.

Figure 3:
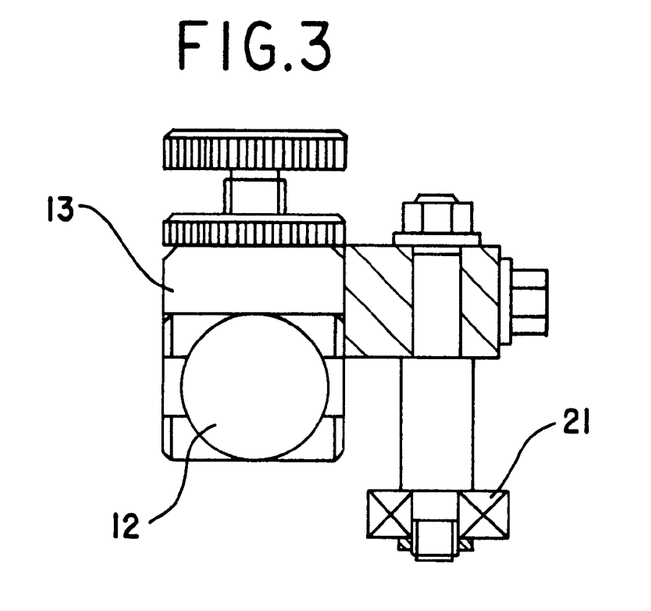
FIG. 3 is a right-side view of FIG. 2 with positioning element 21.
Figure 4:
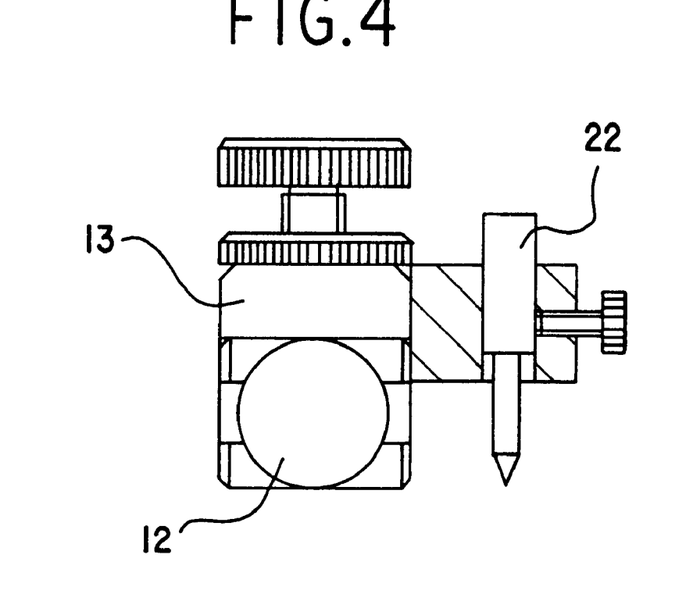
FIG. 4 is a right-side view of FIG. 2 with positioning element 22.
Figure 5:
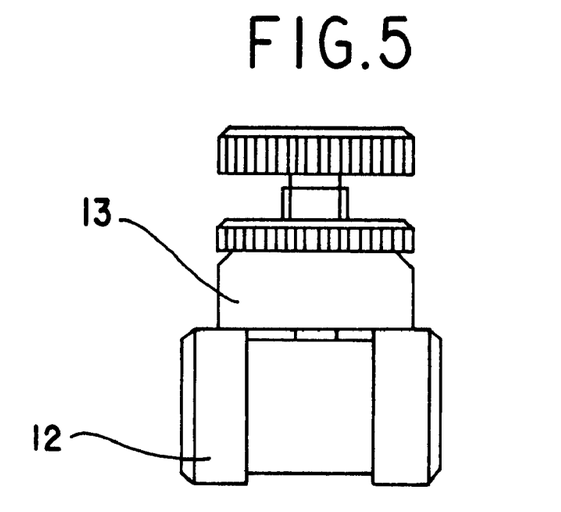
FIG. 5 is a right-side view of FIG. 2 with two rollers.

As described above, the gauges must be positioned correctly as they are placed every time. It means that every gauge should be fixed around and within a cross-sectional plane of the workpiece to be measured as possible as it can. If the workpiece formed as a cylinder, for instances, has a processed end surface and the diameter to be measured is close to it, such as the diameter of a disk, the accessory 21 (FIG. 3) is assembled on the body 13. It is a ball bearing placed in pairs along the direction of the central distance. While measuring, the two ball bearings are placed contacting with the end surface of the workpiece, then the correctness of the positioning of each gauge on the workpiece can ensured. If there is no processed end surface or the diameter to be measured is far away from the end surface, for example, the diameter in the middle of a long shaft, there are two methods to be selected. For the first method, the accessory 22 (FIG. 4) is assembled in pairs on the body 13 along the direction of the central distance of the gauge. The accessory 22 is a positioning pin with a tip on its end. It can move along its axis when the screw is loosened. Before measuring, fix a mark-pen upon the tool carrier, then turn the workpiece around, a marked circle can be left on the surface of workpiece at where the diameter is required to be measured. Every time the gauge is placed, the correctness of the positioning can be guaranteed by making the tip of the pin aim at the marked circle. This is named the positioning method of marked circle. With respect to the second method, the two positioning elements are both rollers. In order to make it easier to operate, the roller is designed as I-shaped at its axial section (FIG. 5). Before measuring, a micrometer dial is fixed on the tool carrier of the machine, and its measuring head contacted with the generatrix of the roller. Now move the tool carrier along the axial direction and adjust the gauge to make the axis of the roller parallel to the moving direction of the tool carrier. Thus the axis of the roller is parallel to the axis of workpiece. Then the next gauge is placed such that the generatrixes of the rollers of the two gauges contact well. Thus every gauge can be positioned correctly in this way. This is named as the positioning method of rollers.

There are two methods to measure the closed size. In the first method, the closed size 1' can be obtained by measuring the distance between the first gauge's roller and the last gauge's ball with measuring blocks or plug gauges. This method is named the clearance method. The other one is named as the double-roller method. It requires a long roller as the accessory to measure the closed size. When measuring, the long roller should be put on the workpiece initially. Make it sure that its axis parallel to the axis of the workpiece in the way as described above. Then fix it firmly but temporarily on the workpiece with glue or by some other method. Afterwards, place the first gauge on the workpiece and make its ball (positioning element 12) contacting with the circumference of the long roller firmly. Then the other gauges are placed in the ways as described above. Note that the last gauge should use a longer roller as the positioning element. Thus, the distance between the last roller's axis and the axis of the accessory makes up the closed distance. The closed size can be measured with the common measuring apparatus such as the outside micrometer or the lever micrometer then. The method is high accurate and efficient. In order to reduce the effect of the not parallelism of the two axes of the rollers, the measurement should be done on both sides of the gauges in equal distances, and the final result be the average value of the two obtained results. To avoid the closed size to be over large and improve the accuracy and efficiency of the measurement, such gauge that with smaller central distance can be made as the finally placed gauge.

Second Embodiment

Figure 6:
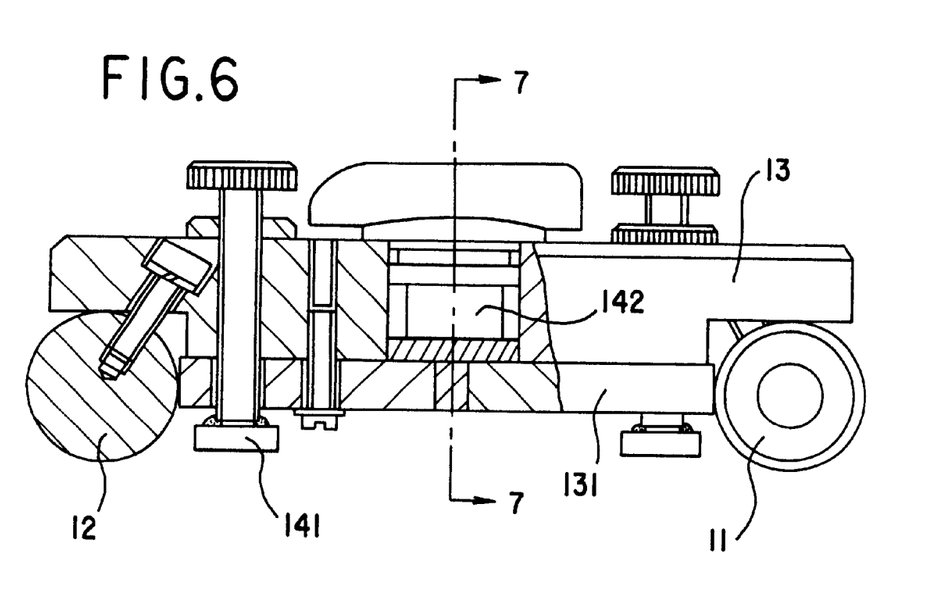
FIG. 6 is a schematic view of the structure of the measuring gauge of the second embodiment.
Figure 7:
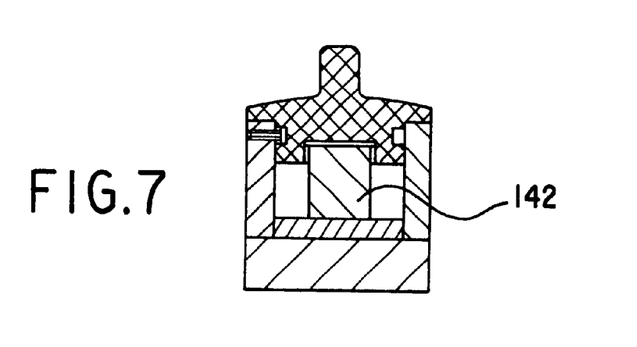
FIG. 7 is a sectional view taken along line 7—7 of FIG. 6.

When the diameter of the workpiece is very large, the size of the gauge is large also. The fastener 14 is a magnetic-force-conversion device with a main permanent magnet 142 and a handle (FIGS. 6,7). The fastener is located on the middle of the gauge. While turning the handle, the magnetic path can be switched-off and switched-on. Thus, the magnet force can be created or eliminated. The principle of it is the same as that of the magnetic gauge stands applied in the filed of precision measurement. If necessary, the auxiliary magnets 141 can be set at the both side of the magnetic-force-conversion device. They are fixed on the screws. Their magnetic force is smaller than that of the main magnet. By turning the screws, the distance and then the magnetic force between the two auxiliary magnet s and the workpiece can be adjusted. The aim of employing the auxiliary magnets is to simplify the operation. That is, firstly have the main magnet do not work, then place the gauge to the workpiece by adjusting the two auxiliary magnets so that the gauge is only just attach on the workpiece by magnetic force. Afterwards, move the gauge and position it correctly. Finally, by turning the handle, the gauge can be fixed to the workpiece firmly with main magnet.

Third Embodiment

Figure 8:
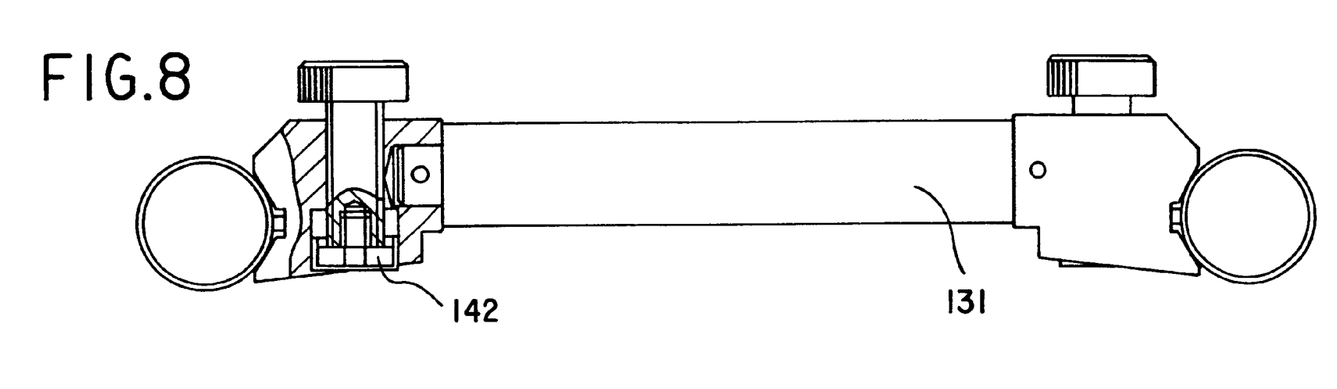
FIG. 8 is a schematic view of the structure of the measuring gauge of the third embodiment.
Figure 9:
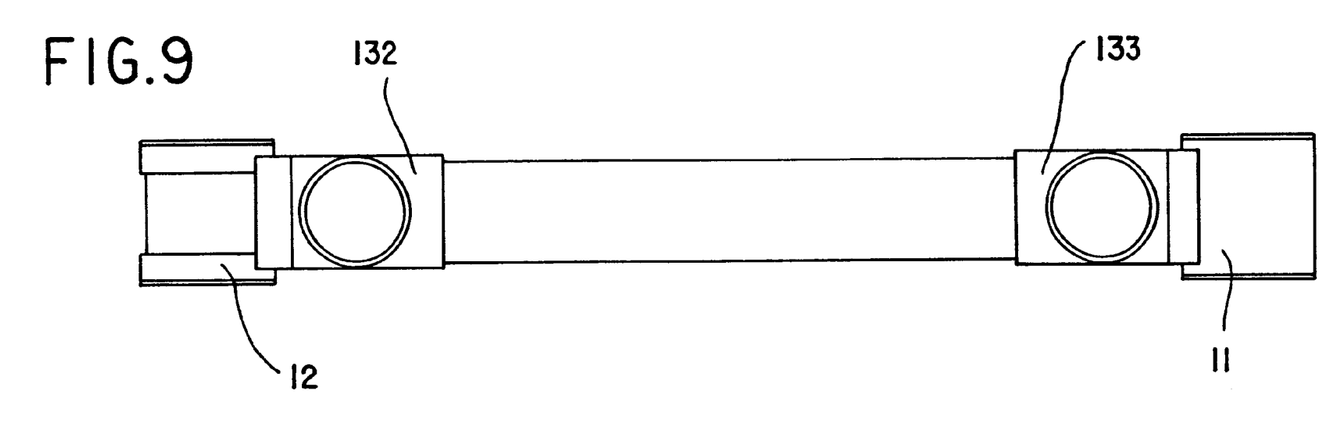
FIG. 9 is a top plan view of the structure of the measuring gauge of FIG. 8.

As shown in FIG. 8 and FIG. 9, the body of the gauge is mainly composed of the pole or pipe 131, left brace block 132 and right brace block 133. The reason of employing the pole or pipe 131 as the main part of the body is to increase the length of the gauge and then the measuring efficiency. Because the gauge is long, two permanent magnets 141 and 142 are arranged at both sides of the gauge to ensure the enough magnetic force. Wherein 141 is located within the right brace block 133 (not shown) as the same way like 142 within the left one. The positioning element 12 is a roller in FIG. 8 and FIG. 9. It can be a ball also.

Fourth Embodiment

Figure 10:
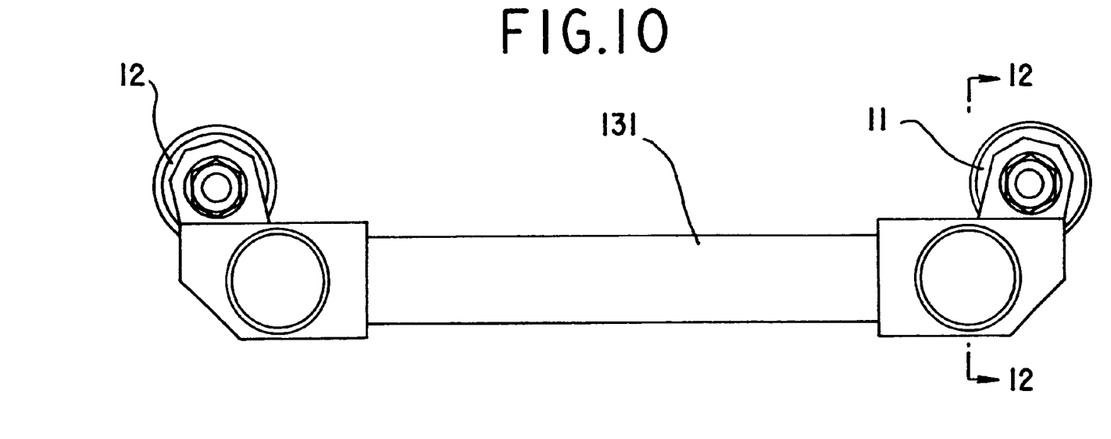
FIG. 10 is a schematic view of the structure of the measuring gauge of the fourth embodiment.
Figure 11:
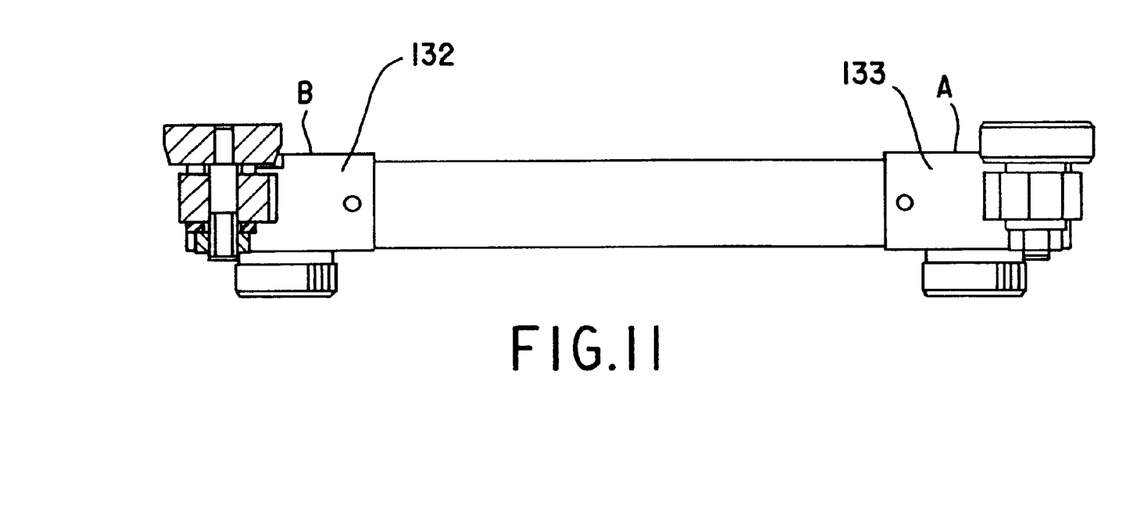
FIG. 11 is a top plan view of the structure of the measuring gauge of FIG. 10.
Figure 12:
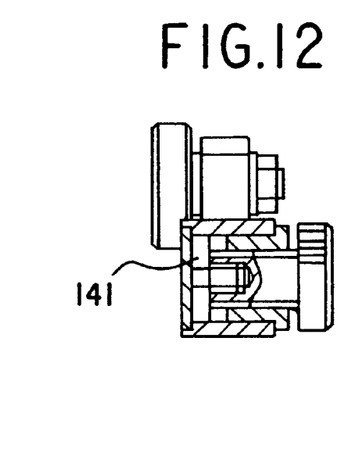
FIG. 12 is a sectional view taken along line 12–12 of FIG. 10.
Figure 13:
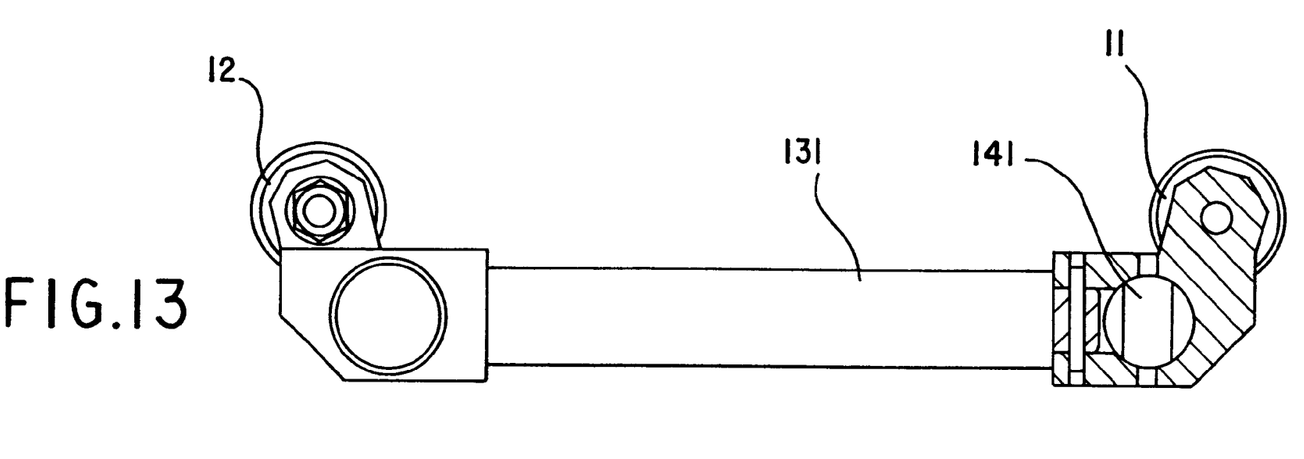
FIG. 13 is a schematic view of the structure of the measuring gauge with a magnetic-force-conversion device of the fourth embodiment.
Figure 14:
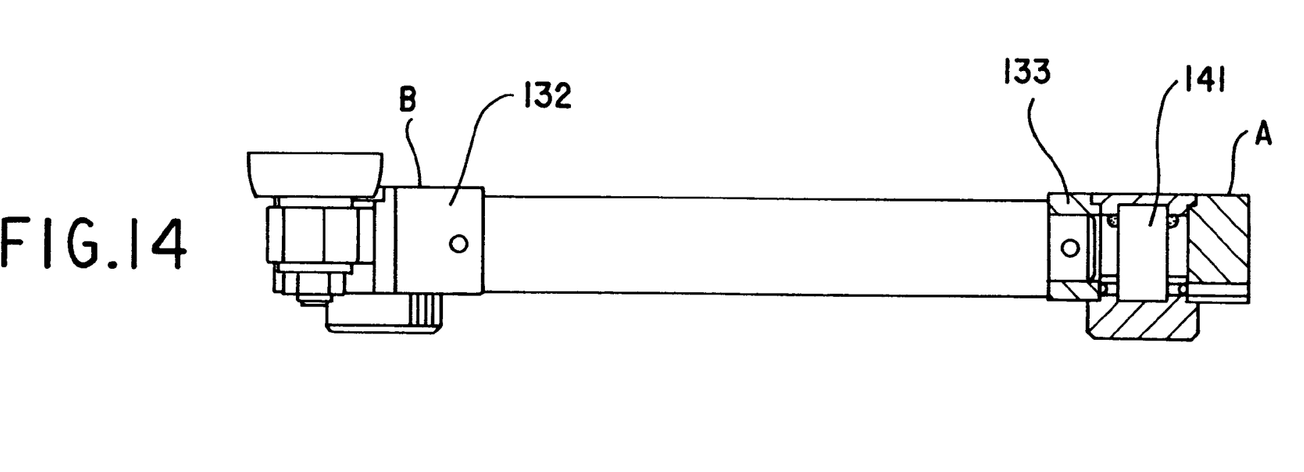
FIG. 14 is a top plan view of the structure of the measuring gauge of FIG. 13.

As shown in FIG. 10, FIG. 11 and FIG. 12, the body of the gauge is mainly composed of the pole or pipe 131, left brace block 132 and right brace block 133. The reason of employing the pole pipe 131 as the main part of the body is to increase the length of the gauge and then to raise the measuring efficiency. Because the gauge is long, two permanent magnets 141 and 142 are arranged at both sides of the gauge to ensure the enough magnetic force. Wherein 142 is located within the left brace block 132 (not shown) as the same way like 141 within the right one. The part of the magnet equipment can be replaced by the magnetic-force-coversion device in which a permanent magnet is included, as shown in FIG. 13 and FIG. 14. The magnetic path can be switched-off or switch-on by turning the maget 141 and 142 (not shown, as 141) so that left brace block 132 and right brace block 133 appear magnetic or not. Its principle is the same as a magnetic gauge stands used in the field of precision measurement. The surface A, B on the left brace block 132 and right brace block 133 contact directly to the end surface of workpiece to be measured to ensure every gauge positioned in a cross-sectional plane of the workpiece. The advantage of it is that the length of the gauge can be longer and not limited to the arc surface of workpiece. In order to facilitate the assembly of the positioning ball, one side or two sides of the ball can be cut off, while the central part including the diameter of the ball (partial ball) should be remained.

Fifth Embodiment

In the fourth embodiment, the measurement of large diameters can also be accomplished with the above method even the positioning roller 11 is replaced by a ball, provided that all centers of the positioning elements 11 and 12 of every gauge are within a cross-sectional plane of the workpiece. This can be realized by contacting directly the surfaces A and B on the left brace block and right brace block 133 with the end surface of the workpiece, in which the distances from the centers of the positioning 11 and 12 of all gauges to the surfaces A and B are designed to be equal. In addition, this device can also be used to measure the end diamters of large cone or conical bore. Firstly, a hypothesis diameter is measured with the above-mentioned method, then the end diameter of the cone or conical bore can be calculated according to the distance from the centers of the positioning element 11 and 12 to the end surface of the workplace and the taper angle of the cone or conical bore. In order to facilitate the assembly of the positioning balls, one side or two sides of the balls can be cut off, while the central part including the diameter of the ball (partial ball) should be remained.

Applications in Industry

A large diameter gauge of high precision and compact size and its method of measurement are described in this invention. It can be used in the field of manufacturing, electric power (including atomic power), aeronautics, aerospace, naval architecture, mining, metallurgy, transportation industry, and so on. It greatly improves the situation of the on-the-spot measurement of large diameters. It has good versatility: both external and internal diameters can be measured, and there is no upper limitation of measuring range. While there is a gap or more in the cylinder, the diameter can also be measured. As described above, the invention can be expected to have wide applications in industry.

What is claimed is:

1. A versatile large diameter measuring device characterized in that it comprises a series of independent measuring gauges and several positioning accessories; each measuring gauge comprising two positioning elements, a fastener and a body, wherein said two positioning elements placed at two ends of said body are a ball and a roller, said fastener arranged in said body is a permanent magnet or a magnetic-force-conversion device with a built-in permanent magnet and said positioning accessories are connected to the body.

2. The versatile large diameter measuring device as set forth in claim 1, characterized in that, said ball of the position element can be a roller having an I-shaped axial section.

3. The versatile large diameter measuring device as set forth in claim 1, characterized in that, said measuring gauge includes the positioning accessories fixed to the body.

4. The versatile large diameter measuring device as set forth in claim 3, characterized in that, said positioning accessories connected to said body of said measurement gauge are one of ball bearings or positioning tips placed in pairs along a direction of central distance on said gauge.

5. A method for measuring a large diameter using a versatile large diameter device having a series of independent measuring gauges and several positioning accessories; each measuring gauge comprising two positioning elements, a fastener and a body, wherein said two positioning elements placed at two ends of said body are a ball and a roller, characterized in that, several measuring gauges are placed head to end or end to head and closely fixed with permanent magnets or magnetic-force-conversion devices with built-in permanent magnets as fasteners around a circumference of a workpiece to be measured until a remnant space is not large enough to put in another gauge, after which, mark down parameters of the gauges placed and measure a closed size, then the diameter of the workpiece can be obtained through the geometric relations established by the measuring gauges and the workpiece.

6. The method for measuring a large diameter as set forth in claim 5, characterized in that, a few gauges are placed upon the circumference of the workpiece, then while keeping the first or first several unmoved, place move gauges in turn, until the remnant space is not large enough to put in another gauge, after which mark down the parameters of the gauges and their repeated times, measure the closed size, the diameter is then obtained according to the geometric relations.

7. The method for measuring a large diameter as set forth in claim 5 or 6, characterized in that, two ball bearings are used for the positioning apparatus, and external cylinder surfaces of the two ball bearings are connected tightly to the end surface of the workpiece.

8. The method for measuring a large diameter as set forth in claim 5 or 6, characterized in that, a circle is marked at the circumference of the workpiece to be measured on a processing machine before measuring, and a positioning tip in said every gauge aims at the marked circle while measuring.

9. The method for measuring a large diameter as set forth in claims 5 or 6, wherein before measuring, a micrometer is placed upon a tool carrier, then place the first gauge upon the work piece and ensure that the gauge's generatrix contacts a tip of the micrometer, move the tool carrier in an axial direction and adjust the gauge to make its axle parallel to the moving direction of the tool carrier, when the gauge's axle is parallel to the axle of the work piece, then place the second gauge so that two roller's generatrix of said two gauges contact well.

10. A versatile large diameter measuring device comprising a series of independent measuring gauges, each measuring gauge comprising two positioning elements, a fastener, several positioning accessories, and a body, wherein said two positioning elements placed at two ends of said body are a ball and a roller, said fastener arranged in said body is a permanent magnet or a magnetic-force-conversion device with a built-in permanent magnet, and said positioning accessories are fixed to the body.

11. The versatile large diameter measuring device as set forth in claim 10, wherein said bail of the positioning element is a partial ball that includes the diameter of said ball.

12. The versatile large diameter measuring device as set forth in claim 10, wherein said roller of the position element is one of a ball or a partial ball that includes the diameter of said ball.

13. The versatile large diameter measuring device as set forth in claim 10, wherein said positioning accessories connected to said body of said measurement gauge are positioning tips placed in pairs along a direction of central distance on said gauge.

* * * * *